United States Patent
Tian et al.

(10) Patent No.: US 10,571,934 B2
(45) Date of Patent: *Feb. 25, 2020

(54) TARGET TRACKING METHOD FOR AIR VEHICLE

(71) Applicant: Yuneec International (China) Co.,Ltd, Kunshan, Jiangsu (CN)

(72) Inventors: Yu Tian, Jiangsu (CN); Wenyan Jiang, Jiangsu (CN)

(73) Assignee: Yuneec International (China) Co., Ltd, Kunshan, Jiangsu (CN)

(*) Notice: Subject to any disclaimer, the term of this patent is extended or adjusted under 35 U.S.C. 154(b) by 277 days.

This patent is subject to a terminal disclaimer.

(21) Appl. No.: 15/582,662

(22) Filed: Apr. 29, 2017

(65) Prior Publication Data

US 2018/0107229 A1    Apr. 19, 2018

(30) Foreign Application Priority Data

Apr. 29, 2016 (CN) .......................... 2016 1 0282288

(51) Int. Cl.
*G05D 1/12* (2006.01)
*G05D 1/00* (2006.01)
*G05D 1/10* (2006.01)

(52) U.S. Cl.
CPC .............. *G05D 1/12* (2013.01); *G05D 1/0094* (2013.01); *G05D 1/102* (2013.01)

(58) Field of Classification Search
None
See application file for complete search history.

(56) References Cited

U.S. PATENT DOCUMENTS

| | | | |
|---|---|---|---|
| 9,147,260 B2 * | 9/2015 | Hampapur | G06T 7/277 |
| 9,483,839 B1 * | 11/2016 | Kwon | H04N 5/33 |
| 2010/0073502 A1 * | 3/2010 | An | H04N 5/232 |
| | | | 348/222.1 |
| 2010/0166261 A1 * | 7/2010 | Tsuji | G06K 9/00228 |
| | | | 382/103 |
| 2017/0300778 A1 * | 10/2017 | Sato | H04N 5/2226 |
| 2018/0362185 A1 * | 12/2018 | Qian | B64C 39/024 |

* cited by examiner

*Primary Examiner* — Abdhesh K Jha

(57) ABSTRACT

A target tracking method for an air vehicle includes steps of: during a flight of an air vehicle main body to a position corresponding to a global positioning system (GPS) positioning signal, taking pictures of an area where a reference target is located by a camera, and obtaining a reference image; extracting reference image characteristics of the reference target and initial position information of the reference target in the reference image from the reference image; when the camera obtains a temporary image showing a temporary target, extracting temporary image characteristics of the temporary target and temporary position information of the temporary target in the temporary image from the temporary image; if the reference image characteristics are consistent with the temporary image characteristics, calculating a deviation direction according to a difference between the initial position information and the temporary position information; and tracking the temporary target in the deviation direction.

9 Claims, 1 Drawing Sheet

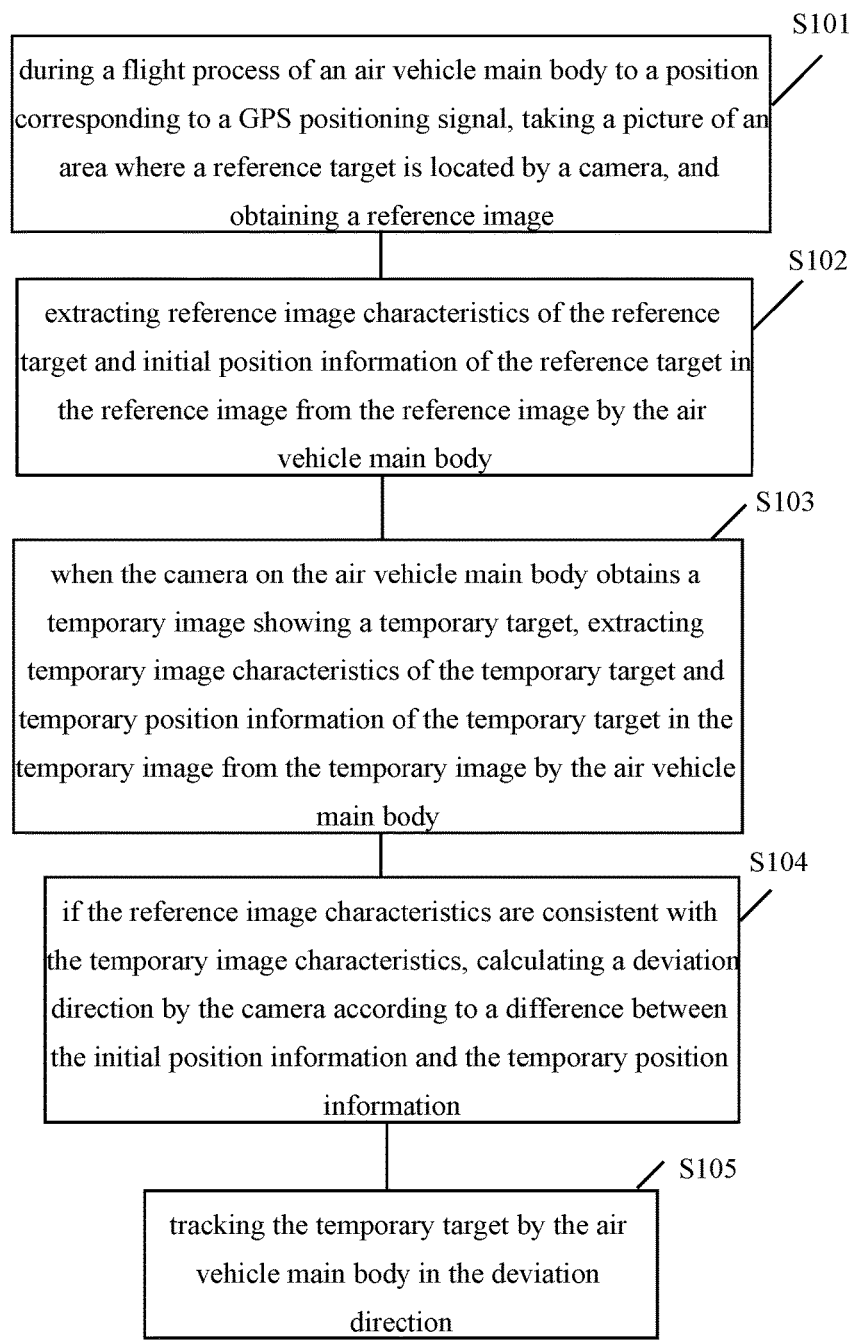

TARGET TRACKING METHOD FOR AIR VEHICLE

CROSS REFERENCE OF RELATED APPLICATION

The application claims priority under 35 U.S.C. 119(a-d) to CN 201610282288.5, filed Apr. 29, 2016.

BACKGROUND OF THE PRESENT INVENTION

Field of Invention

The present invention relates to a field of automatic control, and more particularly to a target tracking method for an air vehicle.

Description of Related Arts

The basic principle of positioning and navigation of the global positioning system (GPS) is to measure a distance between the satellite at the known position and the user receiver, then calculate a specific position of the user receiver according to the distance, and track the user receiver at the specific position.

In the conventional tracking system, the GPS is often utilized for global positioning and navigation. For example, the GPS provides services for vehicle positioning, burglary prevention, driving route monitoring, and command calling.

With the popularity of the air vehicle in life, the services provided by the GPS are more widely applied to the air vehicle. For example, the air vehicle is used for aerial photographing, positioning, or tracking. However, tracking the target merely through the GPS has some shortcomings. Because the GPS mainly depends on the satellites to position the target, the positioning accuracy relies on the position and the number of the satellites. At the area which is difficult to be covered by the satellites due to the high-rises or high mountains, the GPS has the low signal strength and is difficult to position the target, causing the tracking failure.

SUMMARY OF THE PRESENT INVENTION

An object of the present invention is to provide a target tracking method for an air vehicle, so as to solve above problems in prior arts.

A target tracking method for an air vehicle comprises steps of:

during a flight process of an air vehicle main body to a position corresponding to a positioning signal of a global positioning system (GPS), taking a picture of an area where a reference target is located by a camera, and obtaining a reference image;

extracting reference image characteristics of the reference target and initial position information of the reference target in the reference image from the reference image by the air vehicle main body;

when the camera on the air vehicle main body obtains a temporary image showing a temporary target, extracting temporary image characteristics of the temporary target and temporary position information of the temporary target in the temporary image from the temporary image by the air vehicle main body;

if the reference image characteristics are consistent with the temporary image characteristics, calculating a deviation direction by the camera according to a difference between the initial position information and the temporary position information; and tracking the temporary target by the air vehicle main body in the deviation direction.

Preferably, the method further comprises steps of: extracting first reference scale information and second reference scale information of the reference target from the reference image by the camera, wherein the first reference scale information is a width value of the reference target in the reference image; and the second reference scale information is a height value of the reference target in the reference image;

when the camera judges that the reference image characteristics are consistent with the temporary image characteristics, extracting first temporary scale information and second temporary scale information of the temporary target from the temporary image by the camera, wherein the first temporary scale information is a width value of the temporary target in the temporary image; and the second temporary scale information is a height value of the temporary target in the temporary image;

when a value of the first reference scale information is larger than a value of the first temporary scale information, calculating a difference between the first reference scale information and the first temporary scale information by the camera; and, if an absolute value of the difference is larger than a preset threshold, accelerating a motion of the air vehicle main body;

when the value of the first reference scale information is smaller than the value of the first temporary scale information, calculating the difference between the first reference scale information and the first temporary scale information by the camera; and, if the absolute value of the difference is larger than the preset threshold, decelerating the motion of the air vehicle main body;

when a value of the second reference scale information is larger than a value of the second temporary scale information, calculating a difference between the second reference scale information and the second temporary scale information by the camera; and, if an absolute value of the difference is larger than the preset threshold, accelerating the motion of the air vehicle main body; and when the value of the second reference scale information is smaller than the value of the second temporary scale information, calculating the difference between the second reference scale information and the second temporary scale information; and, if the absolute value of the difference is larger than the preset threshold, decelerating the motion of the air vehicle main body.

Further preferably, a distance between the air vehicle main body and the temporary target meets a constraint condition of 0.9×Z<X<1.1×Z, wherein Z is the preset threshold and X is the distance between the air vehicle main body and the temporary target.

Further preferably, the method further comprises steps of:

when temporary vertical coordinates of the temporary position information are inconsistent with initial vertical coordinates of the initial position information, calculating a difference between the temporary vertical coordinates and the initial vertical coordinates, and generating longitudinal displacement information by the air vehicle main body, wherein: the initial vertical coordinates are position coordinates of the reference target in a first coordinate system which is established according to the reference image; and the temporary vertical coordinates are position coordinates of the temporary target in a second coordinate system which is established according to the temporary image; and adjusting a vertical angle of the camera, which captures the temporary image, by the air vehicle main body.

Further preferably, the method further comprises steps of:
when temporary horizontal coordinates of the temporary position information are inconsistent with initial horizontal coordinates of the initial position information, calculating a difference between the temporary horizontal coordinates and the initial horizontal coordinates, and generating transverse displacement information by the air vehicle main body, wherein: the initial horizontal coordinates are position coordinates of the reference target in the first coordinate system which is established according to the reference image; and the temporary horizontal coordinates are position coordinates of the temporary target in the second coordinate system which is established according to the temporary image; and adjusting a horizontal angle of the camera, which captures the temporary image, by the air vehicle main body.

Further preferably, the method further comprises steps of: finding a similar target in the temporary image in real-time and extracting reference characteristics of the similar target by the camera; and, if the reference characteristics are consistent with one of the temporary image characteristics, selecting the similar target as a candidate target in a target group.

Further preferably, the method further comprises steps of: when the air vehicle main body detects that any one of the temporary image characteristics, the temporary position information, the first temporary scale information and the second temporary scale information changes, replacing the temporary image characteristics, the temporary position information, the first temporary scale information and the second temporary scale information before changing by the temporary image characteristics, the temporary position information, the first temporary scale information and the second temporary scale information after changing.

Further preferably, the method further comprises steps of:
obtaining and calculating temporary coordinate information, first temporary scale information and second temporary scale information of the similar target by the camera, wherein the first temporary scale information is a width value of the similar target in the temporary image; and the second temporary scale information is a height value of the similar target in the temporary image;

when the camera detects the target group and tracks the temporary target, weighting temporary coordinate information, first temporary scale information and second temporary scale information of each candidate target in the target group respectively with the temporary position information, the first temporary scale information and the second temporary scale information of the temporary target, outputting weighting results thereof to the camera, and showing the weighting results by the camera;

when the camera does not track the target group but tracks the temporary target, outputting the temporary position information, the first temporary scale information and the second temporary scale information of the temporary target to the camera, and showing the temporary position information, the first temporary scale information and the second temporary scale information of the temporary target by the camera;

when the camera detects the target group but does not track the temporary target, respectively weighting the temporary coordinate information, the first temporary scale information and the second temporary scale information of all the candidate targets in the target group, outputting weighting results thereof to the camera, and showing the weighting results by the camera; and when the camera does not detect the target group and track the temporary target, not outputting information to the camera.

Further preferably, the first coordinate system is same as the second coordinate system.

Further preferably, methods for recording the temporary image characteristics of the temporary target comprise a gradient direction histogram, a local binary pattern histogram, scale invariant feature transformation, and speeded up robust features.

The target tracking method for the air vehicle main body, provided by the present invention, comprises steps of: during the flight process of the air vehicle main body to the position corresponding to the positioning signal of the GPS, taking the picture of the area where the reference target is located by the camera, and obtaining the reference image; extracting the reference image characteristics of the reference target and the initial position information of the reference target in the reference image from the reference image by the camera; when the camera obtains the temporary image showing the temporary target, extracting the temporary image characteristics of the temporary target and the temporary position information of the temporary target in the temporary image from the temporary image; if the reference image characteristics and the temporary image characteristics are consistent, calculating the deviation direction by the camera according to the difference between the initial position information and the temporary position information; and tracking the temporary target by the air vehicle main body in the deviation direction. The air vehicle main body adjusts a direction according to a relative position between the reference image and the temporary image, so that the air vehicle main body tracks the target more accurately.

For better understanding the objects, the features and the advantages of the present invention, a preferred embodiment is described in detail with the accompanying drawing as follows.

BRIEF DESCRIPTION OF THE DRAWINGS

To illustrate the technical solutions of the preferred embodiment of the present invention more clearly, the accompanying drawing referenced in the preferred embodiment is simply described as follows. The accompanying drawing merely shows some preferred embodiments of the present invention and is not intended to be limiting. For one skilled in the art, it is easy to obtain other related drawings from the accompanying drawing without the creative work.

The drawing is a sketch view of a target tracking method for an air vehicle according to a preferred embodiment of the present invention.

DETAILED DESCRIPTION OF THE PREFERRED EMBODIMENT

With the accompanying drawing, technical solutions of the preferred embodiment of the present invention are clearly and completely described as follows. It is obvious that the described preferred embodiment is exemplary only. Generally, the parts described and showed in the accompanying drawing can be arranged and designed with various configurations. Thus, the detailed description of the preferred embodiment showed in the accompanying drawing of the present invention is not for limiting the protection scope of the present invention but only for illustrating the selected preferred embodiment of the present invention. Based on the preferred embodiment of the present invention, other embodiments obtained by one skilled in the art without the creative work also belong to the protection scope of the present invention.

In description of the present invention, it is noted that the orientation or position relationship described by words such as "center", "above", "below", "left", "right", "vertical", "horizontal", "internal" and "external" is based on the accompanying drawing, which is only for simplifying the description of the present invention, not for indicating or implying a specific orientation, and a structure and an operation at the specific orientation of the devices or parts. Thus, the above words are not the limitations of the present invention. Moreover, words such as "first", "second", and "third" are only for description, not for indicating or implying a relative importance. The words, "first position" and "second position", illustrate two different positions.

In description of the present invention, unless specifically regulated and limited, words such as "mount", "link", "connect" should be comprehended in the broad sense. For example, the parts can be fixedly connected, detachably connected or integrally connected; the parts can be mechanically connected or electrically connected; the part can be directly connected or indirectly connected through a medium; and two parts can be intercommunicated with each other. For one skilled in the art, it is easy to understand the specific meaning of the above words in the present invention.

Nowadays, a tracking air vehicle is often applied for positioning and tracking a target. A common way in the industry is to obtain longitude and latitude coordinates of a tracking target through a global positioning system (GPS), and then command the tracking air vehicle to fly towards the longitude and latitude coordinates of the tracking target, thereby realizing tracking. Because the GPS is dependent on a satellite to transmit a signal, the GPS signal will be weakened or interrupted at some special areas, for example at a mountain area, some high mountains block signal transmission of the satellite; and more seriously, the tracking air vehicle is unable to obtain the GPS signal, causing a tracking failure.

Referring to the drawing, according to a preferred embodiment of the present invention, a target tracking method for an air vehicle is provided, which is applicable to the tracking air vehicle, wherein the tracking air vehicle comprises an air vehicle main body and a camera; the air vehicle main body comprises an air vehicle unit and a tripod head, and the tripod head is arranged at a lower part of the air vehicle unit; the camera is fixed on the tripod head; the camera comprises a processor, and a lens of the camera is towards a flight direction of the air vehicle main body.

The target tracking method for the air vehicle comprises steps of:

(S101), receiving longitude and latitude coordinates of a tracking target, which are sent from a GPS, by a GPS signal receiver arranged on the tracking target; starting the air vehicle main body, and obtaining the longitude and latitude coordinates transmitted from the GPS signal receiver by the air vehicle main body; according to the longitude and latitude coordinates, the air vehicle main body flying towards a position corresponding to a GPS positioning signal; during flight, taking a picture of an area where a reference target is located by the camera, and obtaining a reference image;

(S102), extracting reference image characteristics of the reference target and initial position information of the reference target in the reference image from the reference image by the camera, wherein: the reference target is at a position of a point of the reference image; during practical operation, coordinates of the point in a first coordinate system which is established according to the reference image are denoted as the initial position information; similarly, temporary target hereinafter is at a position of a point of a temporary image, and during the practical operation, coordinates of the point in a second coordinate system which is established according to the temporary image are denoted as temporary position information; the reference image characteristics and the initial position information are initialized in the air vehicle main body; the reference image characteristics are reference characteristics for subsequently selecting the tracking target that a target conform to the reference image characteristics is denoted as the tracking target; the initial position information serves as a reference point of the tracking target in the image obtained by the camera; the first coordinate system is same as the second coordinate system; according to the present invention, a top left corner vertex of the reference image is a coordinate origin, a positive axis of an X-axis is at a right side of the coordinate origin, a positive axis of a Y-axis is at a downside of the coordinate origin, and a coordinate size is calculated by pixel as the smallest unit; when the tracking target is deviated from the reference point, the air vehicle main body is controlled to turn, so as to adjust a shooting angle of the camera and enable the tracking target to go back to the reference point; during the practical operation, technologies such as background subtraction are adopted to extract information of the reference target, such as a gray level and a color, then interferences brought by noise and a fake target are eliminated through technologies such as threshold processing and morphological operation, and thereafter the reference image characteristics and the initial position information of the reference target are obtained through technologies such as contour extraction;

(S103), because the camera takes pictures in real-time during the flight, when the camera obtains the temporary image showing the temporary target, extracting temporary image characteristics of the temporary target and the temporary position information of the temporary target in the temporary image from the temporary image, wherein: the temporary image characteristics comprise a gray level, a color and a shape of the temporary target; and during the practical operation, the temporary image characteristics of the temporary target are selectively extracted according to an application situation;

(S104), if the reference image characteristics are consistent with the temporary image characteristics, calculating a deviation direction by the camera according to a difference between the initial position information and the temporary position information, for example the color and a shape of the reference target is extracted from the reference image, and the color and the shape of the temporary target is extracted from the temporary image, only when the color of the temporary target is consistent with the color of the reference target and meanwhile the shape of the temporary target is consistent with the shape of the reference target, the temporary target is judged as the tracking target, wherein: the difference between the initial position information and the temporary position information comprises a difference between horizontal coordinates of the initial position information and horizontal coordinates of the temporary position information, and a difference between vertical coordinates of the initial position information and vertical coordinates of the temporary position information; and the temporary image characteristics of the temporary target comprise a gradient direction histogram, a local binary pattern histogram, scale invariant feature transformation, and speeded up robust features, namely the temporary target is locked as the tracking target through methods such as template matching, histogram matching and a matching method based on a functional link artificial neural network (FLANN); and (S105), tracking the temporary target by the air vehicle main body in the deviation direction, so that the difference between the initial position information and the temporary position information becomes gradually smaller.

Moreover, because the target tracked by the air vehicle main body comprises a static target and a dynamic target, in order to avoid a collision of the air vehicle main body with the target and a loss of the target, a reasonable distance between the air vehicle main body and the target is required. When the air vehicle main body is too near the temporary target, a size of the target in the picture shot by the camera becomes large; and, when the air vehicle main body is too far away from the temporary target, the size of the target in the picture shot by the camera becomes small. Through controlling the air vehicle main body to accelerate or decelerate, the distance between the air vehicle main body and the temporary target meets a constraint condition of $0.9 \times Z < X < 1.1 \times Z$, wherein Z is a preset threshold and X is the distance between the air vehicle main body and the temporary target. For example, if a car goes forward at a constant speed and the air vehicle is responsible for tracking the car and keeps the car at a distance of 500 meters, 500 is the preset threshold.

The air vehicle main body judges the distance to the car according to a change of a width value and a height value of the temporary target in the temporary image. According to the preferred embodiment of the present invention, first reference scale information and second reference scale information of the reference target are extracted from the reference image by the camera, wherein the first reference scale information is a width value of the reference target in the reference image; and the second reference scale information is a height value of the reference target in the reference image;

when the camera judges that the reference image characteristics are consistent with the temporary image characteristics, first temporary scale information and second temporary scale information of the temporary target are extracted from the temporary image by the camera, wherein the first temporary scale information is the width value of the temporary target in the temporary image; and the second temporary scale information is the height value of the temporary target in the temporary image;

when a value of the first reference scale information is larger than a value of the first temporary scale information, a difference between the first reference scale information and the first temporary scale information is calculated by the camera; and, if an absolute value of the difference is larger than the preset threshold, a motion of the air vehicle main body is accelerated;

when the value of the first reference scale information is smaller than the value of the first temporary scale information, the difference between the first reference scale information and the first temporary scale information is calculated by the camera; and, if the absolute value of the difference is larger than the preset threshold, the motion of the air vehicle main body is decelerated;

when a value of the second reference scale information is larger than a value of the second temporary scale information, a difference between the second reference scale information and the second temporary scale information is calculated by the camera; and, if an absolute value of the difference is larger than the preset threshold, the motion of the air vehicle main body is accelerated; and when the value of the second reference scale information is smaller than the value of the second temporary scale information, the difference between the second reference scale information and the second temporary scale information is calculated by the camera; and, if the absolute value of the difference is larger than the preset threshold, the motion of the air vehicle main body is decelerated.

When a position of the temporary target shot by the camera is far away from the reference point in the temporary image, it is required to adjust the flight direction of the air vehicle main body in time. Through controlling the flight direction, the position of the temporary target in the temporary image is still at the reference point. Thus, the target tracking method for the air vehicle further comprises steps of:

when the camera judges that temporary vertical coordinates of the temporary position information are inconsistent with initial vertical coordinates of the initial position information, calculating a difference between the temporary vertical coordinates and the initial vertical coordinates, and generating longitudinal displacement information, wherein: the initial vertical coordinates are position coordinates obtained by the camera in the first coordinate system which is established according to the reference image, and temporary vertical coordinates are position coordinates obtained by the camera in the second coordinate system which is established according to the temporary image;

according to the longitudinal displacement information, a pitch-axis of the tripod head turning, so as to adjust a vertical angle of the camera which captures the temporary image;

when temporary horizontal coordinates of the temporary position information are inconsistent with initial horizontal coordinates of the initial position information, calculating a difference between the temporary horizontal coordinates and the initial horizontal coordinates, and generating transverse displacement information, wherein: the initial horizontal coordinates are position coordinates obtained by the camera in the first coordinate system which is established according to the reference image; and the temporary horizontal coordinates are position coordinates obtained by the camera in the second coordinate system which is established according to the temporary image; and according to the transverse displacement information, a yaw-axis of the tripod head turning, so as to adjust a horizontal angle of the camera which captures the temporary image.

Alternatively, the pitch-axis and the yaw-axis of the tripod head may turn simultaneously, so that the temporary vertical coordinates and the temporary horizontal coordinates change simultaneously.

Furthermore, during a tracking process of the air vehicle main body to the temporary target, because of self-reasons or external reasons, the shape and the color of the temporary target may change, and the temporary image characteristics of the temporary target change, comprising the gradient direction histogram, the local binary pattern histogram, the scale invariant feature transformation and the speeded up robust features. For the above situation, the present invention adopts methods of establishing a target group and updating the temporary image characteristics.

When the camera finds a similar target in the temporary image in real-time, reference characteristics of the similar target are extracted; and, if the reference characteristics of the similar target are consistent with one of the temporary image characteristics, for example a color of the similar target is same as the color of the temporary target, or the color and a shape of the similar target are respectively same as the color and the shape of the temporary target, the similar target is selected as a candidate target in the target group.

When the air vehicle main body detects that any one of the temporary image characteristics, the temporary position information, the first temporary scale information and the second temporary scale information changes, the temporary image characteristics, the temporary position information, the first temporary scale information and the second temporary scale information before changing are replaced by the temporary image characteristics, the temporary position information, the first temporary scale information and the second temporary scale information after changing, so as to eliminate or decrease an interference to a tracking system which is caused by factors such as an appearance change of the temporary target and an occlusion, thereby increasing a stability of the tracking system and an accuracy of tracking results.

For convenient viewing of staffs, according to the present invention, the tracking candidate target of the air vehicle main body, or the position information and the scale information of the temporary target are selectively showed in the camera. Alternatively, the camera is connected to a display, and the display shows the candidate target or the position information and the scale information of the temporary target.

The camera obtains and calculates temporary coordinate information, first temporary scale information and second temporary scale information of the similar target, wherein the first temporary scale information is a width value of the similar target in the temporary image; and the second temporary scale information is a height value of the similar target in the temporary image.

When the camera detects the target group and tracks the temporary target, temporary coordinate information, first temporary scale information and second temporary scale information of each candidate target in the target group are weighted respectively with the temporary position information, the first temporary scale information and the second temporary scale information of the temporary target, then weighting results thereof are outputted to the camera, and showed by the camera.

For example, when the air vehicle is tracking a car, more than one car run in front of the air vehicle and all cars have the same color, the cars except the temporary target are classified as the target group. Under the circumstance, temporary coordinate information, first temporary scale information and second temporary scale information of each car in the target group are weighted respectively with the temporary position information, the first temporary scale information and the second temporary scale information of the temporary target namely the car to be tracked, then weighting results thereof are outputted to the camera, and showed by the camera.

When the camera does not detect the target group but tracks the temporary target, the temporary position information, the first temporary scale information and the second temporary scale information of the temporary target are outputted to the camera and showed by the camera.

For example, when the air vehicle is tracking a car and only one car runs in front of the air vehicle, the car is the temporary target. Temporary position information, first temporary scale information and second temporary scale information of the car are outputted to the camera and showed by the camera.

When the camera detects the target group but does not track the temporary target, the temporary coordinate information, the first temporary scale information and the second temporary scale information of each candidate target in the target group are respectively weighted, then weighting results thereof are outputted to the camera, and showed by the camera.

For example, when the air vehicle is tracking a car, more than one car run in front of the air vehicle, no car is the temporary target but one characteristic of the cars is same as the tracked car, so that the cars are classified as the group target. Under the circumstance, the temporary coordinate information, the first temporary scale information and the second temporary scale information of each car in the target group are respectively weighted, then weighting results thereof are outputted to the camera, and showed by the camera.

When the camera does not detect the target group and track the temporary target, no information is outputted to the camera.

The above results outputted to the camera can also show on the display, so that the staffs are convenient to view a situation of the tracking target of the air vehicle in real-time.

For example, when the air vehicle is tracking a bird, a whole process is as follows.

The tripod head is arranged at a lower part of the air vehicle main body, and an analog camera is fixed on the tripod head. Moreover, the analog camera is located at a front part of the air vehicle main body. The bird to be tracked is able to receive the GPS signal, then the air vehicle main body is started and flies towards the position corresponding to the GPS positioning signal. During the flight, the camera takes pictures of an area where the bird is located and obtains the reference image. The camera extracts the reference image characteristics of the reference target from the reference image, such as a size and a color of the bird, and also extracts the initial position information of the reference target in the reference image. The bird is assumed to be located at a center point of the reference image. During the flight of the air vehicle main body, the camera takes pictures. When the camera obtains the temporary image showing the temporary target, the camera extracts the temporary image characteristics of the temporary target and the temporary position information of the temporary target in the temporary image from the temporary image. When the reference image characteristics are consistent with the temporary image characteristics, the camera calculates the deviation direction according to the difference between the initial position information and the temporary position information, and the air vehicle main body tracks the temporary target in the deviation direction. Moreover, the camera extracts the width value and the height value of the reference target from the reference image. When the camera judges that the reference image characteristics are consistent with the temporary image characteristics, namely, the temporary target is the bird to be tracked, the camera extracts a width value and a height value of the bird from the temporary image. When the width value and the height value of the reference target are inconsistent with the width value and the height value of the bird extracted from the temporary image, a distance between the air vehicle main body and the bird is deviated from the preset threshold. For example, if the width value of the reference target is larger than the width value of the bird extracted from the temporary image, the distance between the air vehicle main body and the bird is larger than the threshold, and the motion of the air vehicle main body is accelerated, so as to keep the distance between the air vehicle main body and the temporary target in a threshold range. According to the present invention, the threshold range is from 0.9×threshold to 1.1×threshold. When the temporary target is deviated from the center point of the reference image, the camera calculates the difference between the temporary vertical coordinates and the initial vertical coordinates and generates the longitudinal displacement information. The pitch-axis of the air vehicle main body turns according to the longitudinal displacement information, so as to adjust the vertical angle of the camera which captures the temporary image. Thereafter, the camera calculates the difference between the temporary horizontal coordinates and the initial horizontal coordinates and generates the transverse displacement information. The yaw-axis of the air vehicle main body turns according to the transverse displacement information, so as to adjust the horizontal angle of the camera which captures the temporary image. Through controlling the air vehicle main body, the flight direction of the air vehicle main body is towards the bird to be tracked in real-time. Meanwhile, in the temporary image obtained by the camera, the bird is still kept at the center point of the reference image, thereby viewing easily and avoiding the loss of the tracking target.

According to the preferred embodiment of the present invention, the target tracking method for the air vehicle has following technical effects. During the flight of the air vehicle main body towards the position corresponding to the GPS positioning signal, the camera obtains the reference image and the temporary image. The characteristic parameters of the reference image and the temporary image are extracted; and thus, without depending on the GPS positioning signal, the air vehicle main body is able to track the target through contrasting and calculating the characteristic parameters, thereby increasing the tracking accuracy.

The above preferred embodiment of the present invention is exemplary only and not intended to be limiting. For one skilled in the art, it is easy to change or modify. Thus, the present invention includes all modifications encompassed within the spirit and scope of the following claims.

What is claimed is:

1. A target tracking method for an air vehicle comprising steps of:
during a flight process of an air vehicle main body to a position corresponding to a positioning signal of a global positioning system (GPS), taking a picture of an area where a reference target is located by a camera, and obtaining a reference image;
extracting reference image characteristics of the reference target and initial position information of the reference target in the reference image from the reference image by the air vehicle main body;
when the camera on the air vehicle main body obtains a temporary image showing a temporary target, extracting temporary image characteristics of the temporary target and temporary position information of the temporary target in the temporary image from the temporary image by the air vehicle main body;
if the reference image characteristics are consistent with the temporary image characteristics, calculating a deviation direction by the camera according to a difference between the initial position information and the temporary position information; and
tracking the temporary target by the air vehicle main body in the deviation direction;
the method further comprises steps of:
extracting first reference scale information and second reference scale information of the reference target from the reference image by the camera, wherein the first reference scale information is a width value of the reference target in the reference image; and the second reference scale information is a height value of the reference target in the reference image;
when the camera judges that the reference image characteristics are consistent with the temporary image characteristics, extracting first temporary scale information and second temporary scale information of the temporary target from the temporary image by the camera, wherein the first temporary scale information is a width value of the temporary target in the temporary image; and the second temporary scale information is a height value of the temporary target in the temporary image;
when a value of the first reference scale information is larger than a value of the first temporary scale information, calculating a difference between the first reference scale information and the first temporary scale information by the camera; and, if an absolute value of the difference is larger than a preset threshold, accelerating a motion of the air vehicle main body;
when the value of the first reference scale information is smaller than the value of the first temporary scale information, calculating the difference between the first reference scale information and the first temporary scale information by the camera; and, if the absolute value of the difference is larger than the preset threshold, decelerating the motion of the air vehicle main body;
when a value of the second reference scale information is larger than a value of the second temporary scale information, calculating a difference between the second reference scale information and the second temporary scale information by the camera; and, if an absolute value of the difference is larger than the preset threshold, accelerating the motion of the air vehicle main body; and
when the value of the second reference scale information is smaller than the value of the second temporary scale information, calculating the difference between the second reference scale information and the second temporary scale information; and, if the absolute value of the difference is larger than the preset threshold, decelerating the motion of the air vehicle main body.

2. The target tracking method for the air vehicle, as recited in claim 1, wherein: a distance between the air vehicle main body and the temporary target meets a constraint condition of $0.9 \times Z < X < 1.1 \times Z$, wherein Z is the preset threshold and X is the distance between the air vehicle main body and the temporary target.

3. The target tracking method for the air vehicle, as recited in claim 2, further comprising steps of:
when temporary vertical coordinates of the temporary position information are inconsistent with initial vertical coordinates of the initial position information, calculating a difference between the temporary vertical coordinates and the initial vertical coordinates, and generating longitudinal displacement information by the air vehicle main body, wherein: the initial vertical coordinates are position coordinates of the reference target in a first coordinate system which is established according to the reference image;

and the temporary vertical coordinates are position coordinates of the temporary target in a second coordinate system which is established according to the temporary image; and adjusting a vertical angle of the camera, which captures the temporary image, by the air vehicle main body.

4. The target tracking method for the air vehicle, as recited in claim 3, further comprising steps of:

when temporary horizontal coordinates of the temporary position information are inconsistent with initial horizontal coordinates of the initial position information, calculating a difference between the temporary horizontal coordinates and the initial horizontal coordinates, and generating transverse displacement information by the air vehicle main body, wherein: the initial horizontal coordinates are position coordinates of the reference target in the first coordinate system which is established according to the reference image; and the temporary horizontal coordinates are position coordinates of the temporary target in the second coordinate system which is established according to the temporary image; and adjusting a horizontal angle of the camera, which captures the temporary image, by the air vehicle main body.

5. The target tracking method for the air vehicle, as recited in claim 1, further comprising steps of: finding a similar target in the temporary image in real-time and extracting reference characteristics of the similar target by the camera; and, if the reference characteristics are consistent with one of the temporary image characteristics, selecting the similar target as a candidate target in a target group.

6. The target tracking method for the air vehicle, as recited in claim 5, further comprising steps of: when the air vehicle main body detects that any one of the temporary image characteristics, the temporary position information, the first temporary scale information and the second temporary scale information changes, replacing the temporary image characteristics, the temporary position information, the first temporary scale information and the second temporary scale information before changing by the temporary image characteristics, the temporary position information, the first temporary scale information and the second temporary scale information after changing.

7. The target tracking method for the air vehicle, as recited in claim 6, further comprising steps of:

obtaining and calculating temporary coordinate information, first temporary scale information and second temporary scale information of the similar target by the camera, wherein the first temporary scale information is a width value of the similar target in the temporary image; and the second temporary scale information is a height value of the similar target in the temporary image;

when the camera detects the target group and tracks the temporary target, weighting temporary coordinate information, first temporary scale information and second temporary scale information of each candidate target in the target group respectively with the temporary position information, the first temporary scale information and the second temporary scale information of the temporary target, outputting weighting results thereof to the camera, and showing the weighting results by the camera;

when the camera does not detect the target group but tracks the temporary target, outputting the temporary position information, the first temporary scale information and the second temporary scale information of the temporary target to the camera, and showing the temporary position information, the first temporary scale information and the second temporary scale information of the temporary target by the camera;

when the camera detects the target group but does not track the temporary target, respectively weighting the temporary coordinate information, the first temporary scale information and the second temporary scale information of all the candidate targets in the target group, outputting weighting results thereof to the camera, and showing the weighting results by the camera; and when the camera does not detect the target group and track the temporary target, not outputting information to the camera.

8. The target tracking method for the air vehicle, as recited in claim 4, wherein the first coordinate system is same as the second coordinate system.

9. The target tracking method for the air vehicle, as recited in claim 5, wherein methods for recording the temporary image characteristics of the temporary target comprise a gradient direction histogram, a local binary pattern histogram, scale invariant feature transformation, and speeded up robust features.

* * * * *